June 9, 1931. A. VAN DUYN 1,809,083
LIQUID BRAKE OR DASHPOT
Filed July 11, 1927

Inventor
Adrianus Van Duyn
By Nissen & Crane Attys.

Patented June 9, 1931

1,809,083

UNITED STATES PATENT OFFICE

ADRIANUS VAN DUYN, OF ROTTERDAM, NETHERLANDS, ASSIGNOR TO NAAMLOOZE VENNOOTSCHAP MAATSCHAPPIJ TOT VERVAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

LIQUID BRAKE OR DASHPOT

Application filed July 11, 1927, Serial No. 204,744, and in Great Britain July 22, 1926.

This invention relates to liquid brakes of the kind comprising a piston movable in a dashpot cylinder communicating with a passage or passages for circulation of the liquid of the brake, said passage or passages being associated with a regulating member serving to control the rate of flow of the liquid therethrough.

The liquid brake according to the invention is particularly adaptable for use in connection with weighing apparatus, but is not restricted to such use.

The object of the present invention is to provide a liquid brake including a centrally arranged regulating device serving to control the circulation of the fluid through a number of passages which are circularly disposed so as to ensure a uniform distribution of the liquid, whereby quiet working of the brake is ensured and liability of the liquid to foam is reduced.

A further object of the invention is to provide an improved arrangement and construction of liquid brake which permits the latter to be inverted, when desired, without danger of leakage of liquid therefrom, and in which the need for stuffing-boxes or other sealing devices is obviated.

According to the present invention there is provided a liquid brake of the kind referred to having liquid-circulating passages which are circularly disposed around the dashpot cylinder, the area of said passages being regulatable by means of a regulating member arranged centrally of said cylinder. The regulating member may be so arranged as to regulate the area of the liquid-circulating passages at their top ends, and is formed with a tubular stem which may pass to the exterior of the casing of the brake through a bush fitted to the cover of said casing.

In order that the invention may be clearly understood there is appended hereto drawings illustrating, by way of example, two forms of liquid brake according to the invention.

Figure 1:
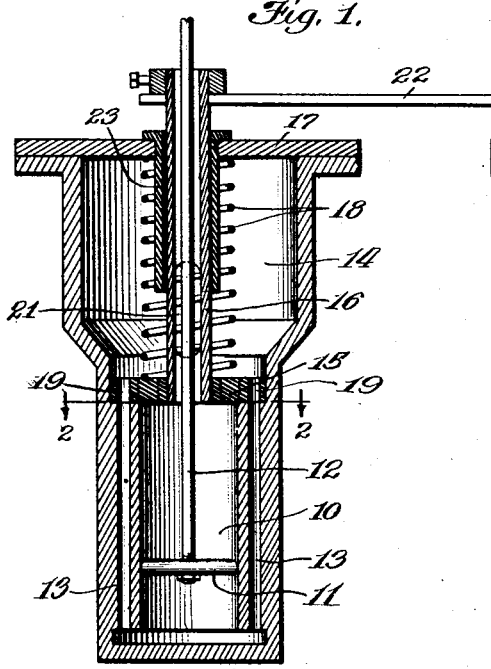
Fig. 1 is a section of one form of the brake.
Figure 5:
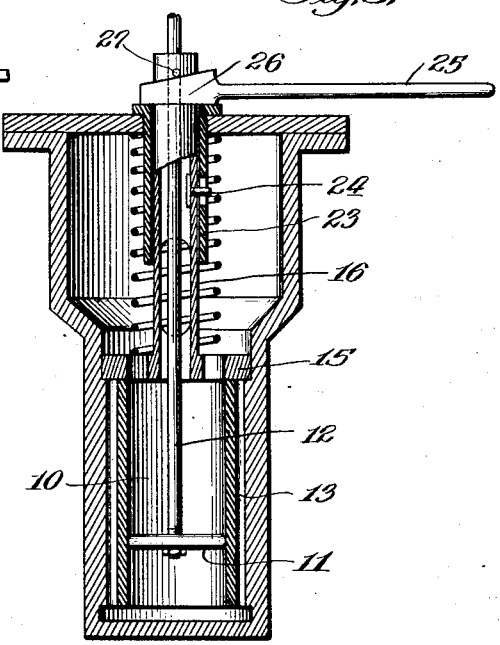
Figure 2:
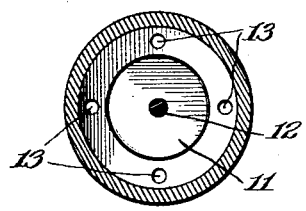
Fig. 2 is a section on the line 2—2 of Fig. 1.
Figure 6:
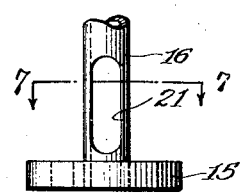
Figure 3:
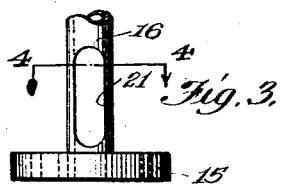
Fig. 3 is a fragmentary elevation of the regulating member.

Figs. 5 and 6, respectively, are views similar to Figs. 1 and 3 showing a modification.

Figure 7:
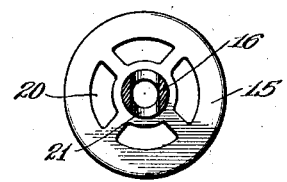
Figure 4:
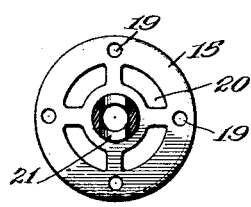
Fig. 4 is a section on the line 4—4 of Fig. 3.

Fig. 7 is a section taken on the line 7—7 of Fig. 6.

Throughout the several figures of the drawings like reference characters indicate like or corresponding parts.

The liquid brake shown in Figs. 1 to 4 comprises a dashpot cylinder 10 and a cooperating piston 11 carried at the lower end of a spindle 12 connectible at its upper end (not shown) with an element to which the brake element is to be applied, and which may be an element of a weighing scale.

Formed in that part of the brake casing which walls the cylinder 10 are four passages 13 arranged in circular spaced relationship therearound. The passages 13 communicate at their lower ends directly with the lower end of the cylinder 10 and at their upper ends open into a chamber 14, which is enclosed by an upward extension of the casing 10.

Bearing upon a ledge formed in the interior of the casing at the top of the cylinder 10 is a valve disc 15, the tubular stem 16 of which extends through the cover 17 of the chamber 14, the spindle 12 passing freely through the stem 16 coaxially therewith. The disc 15 is pressed into effective contact with the ledge aforesaid by means of a spring 18, which also presses against the cover 17. The disc 15 is formed with ports 19 which are positioned so as to be capable of registering with the passages 13. The disc 15 and stem 16, respectively, are formed with openings 20 and 21, which constantly communicate between the top of the cylinder 10 and the chamber 14.

The tubular stem 16 is provided with a regulating handle 22 and is freely guided in a neck bush 23 fitted in the cover 17.

The arrangement is such that angular movement of the handle 22, and of the valve disc 15 therewith, causes to be varied the amount by which the passages 13 register with the ports 19, i. e. the area through which liquid, passing between the spaces in the cylinder 10 above and below the piston 11, is obliged to pass. Hence, the braking load by which movement of the position 11 in the cylinder 10 is opposed can be regulated at will, to suit the requirements set up by any particular conditions.

In the modification shown in Figs. 5 to 7, the valve disc 15 is not formed with ports in its outer ring and is constrained against angular movement by a pin 24, which is fitted to the stem 16 and slidably engages with a vertical slot in the bush 23. The handle 25 is formed with a head 26, which is pivotally mounted on the stem 16 and bears upon the flange of the bush 23. The upper face of the head 26 is inclined and is adapted to co-operate with a pin 27 resting thereon and fitted in the stem 16 of the valve disc 15.

With this arrangement, angular movement of the handle 25 causes the valve disc 15 to be raised or lowered with respect to the upper ends of the passages 13, whereby the area of communication between the upper and lower ends of the cylinder 10 is varied, and the braking load which would oppose movement of the piston 11 and spindle 12 varied proportionately therewith.

The chamber 14 is so dimensioned relatively to the cylinder 10 that, should a weighing machine with which the liquid brake is associated, be inverted the liquid would not be of sufficient depth to overflow by passing between the stem 16 and the bush 23, so that packing or other sealing means for the stem 16 is unnecessary.

The embodiments of the liquid brake according to the present invention which have been hereinbefore described are preferred constructions, but it will be readily understood that many modifications could be devised without departing from the spirit of the invention.

Having now particularly described and ascertained the nature of my said invention and in what manner the same is to be performed, I declare that what I claim is:

1. A liquid brake comprising a housing member having a cylindrical opening at one end thereof, a piston arranged to reciprocate in said opening, said housing having a chamber adjacent one end of said cylindrical opening, the wall of said housing having passages therein extending longitudinally of said cylindrical opening and disposed circumferentially about said passage for shifting circulation of liquid between opposite ends of said cylindrical opening, a spring-held valve for regulating the amount of opening at the ends of said passages, a stem for said valve extending through the end of said chamber, and a bushing sleeve surrounding said stem and extending into said chamber to prevent escape of liquid in case said housing is inverted.

2. A liquid brake comprising a housing member having a cylindrical opening at one end thereof and an enlarged chamber at the opposite end thereof adjacent the end of said cylindrical opening, the wall of said housing about said cylindrical opening having passages circumferentially disposed therein for providing communication between the ends of said cylindrical opening, a piston arranged to reciprocate in said cylindrical opening, a valve having passages therethrough arranged to register with the ends of the passages in the wall of said cylindrical opening, a stem connected with said valve and extending through said enlarged chamber and projecting through the wall thereof, a piston rod connected with said piston and extending through said valve stem, means secured to said valve stem outside of said housing for rotating said valve, a sleeve surrounding said valve stem and projecting into said housing, the wall of said housing having a shoulder thereon surrounding the end of said cylindrical opening, and a spring surrounding said valve stem for holding said valve in contact with said shoulder.

3. A liquid brake comprising a cylinder, a chamber disposed at one end of said cylinder, a rotatable circular valve separating said cylinder and chamber and having an orifice therein establishing free communication between said cylinder and chamber, a second orifice in said valve, and a conduit extending longitudinally of said cylinder connecting the end thereof opposite said valve with said chamber through said second named orifice.

4. A liquid brake comprising a cylinder, a chamber disposed at one end of said cylinder, a spring-held valve separating said cylinder and chamber and having an orifice therein establishing free communication between said cylinder and chamber, a piston in said cylinder, and a conduit extending longitudinally of said cylinder, establishing communication between said chamber and the end of said cylinder opposite said valve, said valve being movable to regulate the rate of fluid flow between said cylinder and chamber.

5. A liquid brake comprising a cylinder, a chamber disposed at one end of said cylinder, a rotatable circular valve separating said cylinder and chamber and having an orifice therein establishing free communication between said cylinder and chamber, a second orifice in said valve, a conduit extending longitudinally of said cylinder and connecting the end thereof opposite said valve with said chamber through said second named orifice, and an opening in said valve adapted to register with said second-named orifice to permit communication between said chamber and said cylinder.

6. A liquid brake comprising a cylinder, a chamber disposed at one end of said cylinder, a ledge at one end of said cylinder, a bore in the wall of said cylinder communicating with the surface of said ledge and with the interior of the cylinder at the end opposite to said ledge, a valve adapted to abut against said ledge and slidably mounted with respect thereto, an opening in said valve adapted to register with said bore to form a communication between said chamber and said cylinder through which liquid in said cylinder is adapted to pass, and means for moving said opening in said valve out of registration with said bore.

7. A liquid brake comprising a cylinder, a chamber disposed at one end of said cylinder, a ledge at one end of said cylinder, a bore in the wall of said cylinder communicating with the surface of said ledge and with the interior of the cylinder at the end opposite to said ledge, a valve adapted to abut against said ledge and slidably mounted with respect thereto, an opening in said valve adapted to register with said bore to form a communication between said chamber and said cylinder through which liquid in said cylinder is adapted to pass, and means for moving said opening in said valve out of registration with said bore, said valve having additional openings therein establishing free communication between said chamber and said cylinder at all times.

8. A liquid brake as set forth in claim 3 in which said valve has means connected thereto extending exteriorly of said brake, and in which means is provided to move said valve in such a manner as to open and close one end of said second orifice to thereby selectively establish a cut-off and communication between said chamber and said cylinder by means of said second-mentioned orifice.

In testimony whereof I have signed my name to this specification on this 13th day of June, A. D. 1927.

ADRIANUS van DUYN.